(12) United States Patent
Stinson et al.

(10) Patent No.: US 11,238,719 B2
(45) Date of Patent: Feb. 1, 2022

(54) PORTABLE PERSONAL MONITOR DEVICE AND ASSOCIATED METHODS

(71) Applicant: Blackline Safety Corp., Calgary (CA)

(72) Inventors: Sean Stinson, Calgary (CA); Kirk Johnson, Calgary (CA); Kelly Englot, Calgary (CA); Phillip Benson, Calgary (CA); Barry Moore, Calgary (CA); Steven Daeninck, Calgary (CA)

(73) Assignee: Blackline Safety Corp., Calgary (CA)

( * ) Notice: Subject to any disclaimer, the term of this patent is extended or adjusted under 35 U.S.C. 154(b) by 0 days.

(21) Appl. No.: 16/872,179

(22) Filed: May 11, 2020

(65) Prior Publication Data

US 2020/0273313 A1    Aug. 27, 2020

Related U.S. Application Data

(63) Continuation of application No. 16/068,322, filed as application No. PCT/CA2017/051177 on Oct. 3, 2017, now Pat. No. 10,699,547.

(Continued)

(51) Int. Cl.
G08B 21/14    (2006.01)
G08B 21/02    (2006.01)
(Continued)

(52) U.S. Cl.
CPC ............. G08B 21/14 (2013.01); G08B 21/02 (2013.01); G08B 21/12 (2013.01); G06Q 10/06 (2013.01);
(Continued)

(58) Field of Classification Search
CPC ............... G01N 33/00; G01N 33/0004; G01N 33/0009; G01N 33/0063; G01N 33/0067;
(Continued)

(56) References Cited

U.S. PATENT DOCUMENTS 4,384,283 A    5/1983   Drope et al.
5,906,726 A *  5/1999   Schneider ............ G01N 27/404
                                                       205/775

(Continued)

FOREIGN PATENT DOCUMENTS

CA    2743210 A1    11/2012
EP    0021190 B1     5/1983
(Continued)

OTHER PUBLICATIONS

European Patent Office, Extended European Search Report Issued in Application No. 17860967.3, dated Aug. 14, 2020, Germany, 15 pages.

(Continued)

Primary Examiner — Van T Trieu
(74) Attorney, Agent, or Firm — McCoy Russell LLP

(57) ABSTRACT

The technology relates to portable personal monitor device and associated methods. In particular, the technology provides for improving the capability of personal monitor device systems by enabling functions such as two-way communications from the personal monitor; associating possible threats with one or more locations; and dynamically determining safe locations and potential evacuation routes. Also described herein are monitors which improve the detection of possible threats or risks by allowing a base unit to be used with various replacement sensor modules.

13 Claims, 6 Drawing Sheets

Related U.S. Application Data

(60) Provisional application No. 62/407,364, filed on Oct. 12, 2016.

(51) Int. Cl.
| | | |
|---|---|---|
| *G08B 21/12* | (2006.01) | |
| *G08B 25/10* | (2006.01) | |
| *G06Q 10/06* | (2012.01) | |
| *G08B 25/00* | (2006.01) | |
| *G08B 27/00* | (2006.01) | |
| *G06Q 50/26* | (2012.01) | |

(52) U.S. Cl.
CPC ... *G06Q 10/0635* (2013.01); *G06Q 10/06398* (2013.01); *G06Q 50/265* (2013.01); *G08B 21/0211* (2013.01); *G08B 21/0269* (2013.01); *G08B 25/001* (2013.01); *G08B 25/10* (2013.01); *G08B 27/001* (2013.01); *Y02P 90/84* (2015.11)

(58) Field of Classification Search
CPC .............. G01N 33/004; G01N 27/404; G01N 27/4045; G08B 21/00; G08B 21/02; G08B 21/14; G08B 21/12; G08B 21/16
See application file for complete search history.

(56) References Cited

U.S. PATENT DOCUMENTS

| | | | |
|---|---|---|---|
| 6,198,394 B1 | 3/2001 | Jacobsen et al. | |
| 6,744,373 B2 | 6/2004 | Koyano et al. | |
| 6,992,580 B2 | 1/2006 | Kotzin et al. | |
| 7,634,361 B2 | 12/2009 | Levesque et al. | |
| 8,149,112 B2 | 4/2012 | Schlager et al. | |
| 8,624,727 B2 | 1/2014 | Saigh et al. | |
| 8,860,570 B2 | 10/2014 | Thomas et al. | |
| 8,866,606 B1 | 10/2014 | Will et al. | |
| 8,917,183 B2 | 12/2014 | Wong | |
| 9,080,883 B2 | 7/2015 | Frey | |
| 9,105,171 B2 | 8/2015 | Flood et al. | |
| 9,182,751 B1 * | 11/2015 | Reeder ................. G01N 33/004 |
| 9,189,944 B2 | 11/2015 | Johnson, Jr. et al. | |
| 10,371,682 B2 * | 8/2019 | Berndt ................. G01N 33/0065 |
| 10,466,221 B2 * | 11/2019 | Yocum ................. G01N 33/004 |
| 2001/0050612 A1 | 12/2001 | Shaffer | |
| 2003/0096590 A1 | 5/2003 | Satoh | |
| 2006/0003740 A1 | 1/2006 | Munje | |
| 2009/0174547 A1 | 7/2009 | Greene et al. | |
| 2011/0133927 A1 | 6/2011 | Humphrey et al. | |
| 2011/0171927 A1 | 7/2011 | Wijayanathan et al. | |
| 2012/0286949 A1 | 11/2012 | Worthington et al. | |
| 2014/0063175 A1 | 3/2014 | Jafry et al. | |
| 2014/0120860 A1 | 5/2014 | Amis | |
| 2015/0137967 A1 | 5/2015 | Wedig et al. | |
| 2015/0279187 A1 | 10/2015 | Kranz | |
| 2015/0365246 A1 | 12/2015 | Kane | |
| 2016/0142894 A1 | 5/2016 | Papakonstantinou et al. | |
| 2016/0223548 A1 * | 8/2016 | Kizuka ................. A61B 5/4255 |
| 2016/0292988 A1 | 10/2016 | McCleary et al. | |
| 2017/0303187 A1 | 10/2017 | Crouthamel et al. | |

FOREIGN PATENT DOCUMENTS

| | | |
|---|---|---|
| EP | 0846440 A2 | 6/1998 |
| EP | 1293946 B1 | 2/2006 |
| EP | 0857341 B1 | 7/2008 |
| EP | 1959655 B1 | 8/2008 |
| EP | 1749287 B1 | 7/2012 |
| EP | 2763112 A2 | 8/2014 |
| EP | 2465104 B1 | 2/2015 |
| EP | 2840561 B1 | 8/2016 |
| WO | 2005069597 A1 | 7/2005 |
| WO | 2006137099 A2 | 12/2006 |
| WO | 2009013508 A1 | 1/2009 |
| WO | 2010070360 A1 | 6/2010 |
| WO | 2011009161 A1 | 1/2011 |
| WO | 2014015141 A1 | 1/2014 |
| WO | 2014114772 A1 | 7/2014 |
| WO | 2015019360 A1 | 2/2015 |
| WO | 2015057187 A1 | 4/2015 |
| WO | 2016005805 A1 | 1/2016 |
| WO | 2016006876 A1 | 1/2016 |

OTHER PUBLICATIONS

ISA Canadian Intellectual Property Office, International Search Report Issued in Application No. PCT/CA2017/051177, dated Jan. 23, 2018, WIPO, 4 pages.

European Patent Office, Partial Supplementary European Search Report Issued in Application No. 17860967.3, dated May 13, 2020, Germany, 183 pages.

* cited by examiner

PORTABLE PERSONAL MONITOR DEVICE AND ASSOCIATED METHODS

CROSS-REFERENCE TO RELATED APPLICATIONS

The present application is a continuation of U.S. patent application Ser. No. 16/068,322, entitled "PORTABLE PERSONAL MONITOR DEVICE AND ASSOCIATED METHODS," filed on Jul. 5, 2018, now U.S. Pat. No. 10,699,547. U.S. patent application Ser. No. 16/068,322 is a U.S. National Phase of International Patent Application Serial No. PCT/CA2017/051177, entitled "PORTABLE PERSONAL MONITOR DEVICE AND ASSOCIATED METHODS," filed on Oct. 3, 2017. International Patent Application Serial No. PCT/CA2017/051177 claims priority to U.S. Provisional Patent Application Ser. No. 62/407,364, filed on Oct. 12, 2016. The entire contents of each of the above-cited applications are hereby incorporated by reference in their entirety for all purposes.

FIELD OF THE INVENTION

The invention relates to portable personal monitor devices and associated methods and systems.

BACKGROUND

Personal monitor devices encompass devices which are carried on the user's person and are configured to monitor the user or the user's environment in order to determine whether the user is in danger. They are particularly, but not exclusively, used to monitor lone workers.

Lone worker monitoring is the practice of monitoring the safety of employees who may be exposed to risk due to work conditions in which they are located out of sight and sound from a person who may be able to offer aid in the event of an emergency.

In some areas, including certain Provinces in Canada and the United Kingdom, legislation has driven the adoption of lone worker policies as well as methods of monitoring the safety of these employees.

A worker may be considered to be working alone if the worker works by himself or herself at a work site in circumstances where assistance is not readily available when needed. In the past, employers could eliminate the risk of workers working alone, as well as the need to comply with the working alone requirements, if they chose to organize work schedules and workplace procedures to eliminate the need for workers to work by themselves. However, in many job and/or field situations this is not always possible.

Other methods have been developed to mitigate the risks to lone workers. These methods include:

Phone-based check-in systems. Employees are required to call in to a designated receiver after a predetermined time. Check-ins are often performed hourly or bi-hourly.

Buddy systems. Employees may be paired up to perform certain tasks. Theoretically, should an emergency occur and one of the employees be rendered incapacitated, the other would remain available to call for help and provide aid. This system may be less reliable in cases where the threat can incapacitate both workers simultaneously (e.g. oxygen deficient and/or toxic gas environments).

Safety monitoring smartphone applications. With the widespread adoption of smart phones, the deployment of a dedicated application allowing employees to quickly request aid has become more feasible. These applications may provide a panic button or allow for prompt check-in without requiring a phone call to be made. This system may not be optimal where the threat is not detectable before it becomes dangerous (e.g. carbon monoxide gas is odourless and so may not be detected by the worker before they succumb).

Safety monitoring devices. Dedicated monitoring devices have become a new best practice in employee safety monitoring. Typically, products of this type offer multiple methods of alerting including both automated and manual methods.

Gas detectors come packaged into two main form factors: portable devices and fixed gas detectors. Fixed type gas detectors are generally mounted near the process area of a plant or control room, or an area to be monitored. These industrial sensors are generally installed on fixed structures and connected by way of a supervisory control and data acquisition (SCADA) system for remote monitoring. The SCADA control operates with coded signals over a communication channel system for continuous monitoring (using typically one communication channel per remote station). On the other hand, portable detectors are used to monitor the atmosphere around personnel by affixing the gas detector to their clothing such as mounting on a waist belt. These gas detectors allow the individual to know, by way of transmitted warnings such as audible and visible signals, when dangerous levels of gas vapors are detected.

As noted above, it has long been established that monitoring of gas concentrations in an ambient atmosphere for a particular area or region is essential for the safety of the people working in those areas or regions. A natural or man-made gas leak could result in the toxic exposure of an individual, and thus detecting the leak is essential to the well-being and safety of the individual or individuals in the exposed area.

In order for gas instruments to adequately measure and indicate risk, systems for monitoring on-going processes often correspond to a baseline signature and compare the current atmospheric signature to that established baseline. A deviation from comparison of the baseline to the atmospheric signature can be effective at eliciting a response to a potentially lethal exposure; or, alerting the individual to other atmospheric risk based on the sensor measurements.

It will be appreciated that monitor systems may be used in situations where people are not working alone (e.g. working in teams; refinery workers, water treatment plants etc.)

SUMMARY

In accordance with the present disclosure, there is provided portable personal monitor devices and associated methods.

According to a first aspect, there is provided a portable personal monitor device, the device comprising:

one or more threat sensors configured to measure environmental or user parameters;

a communicator configured to support two-way voice communication with a remote device;

an alarm configured to notify the user of a threat;

wherein the portable personal monitor device is configured, in response to the measured environmental or user parameters going beyond a predetermined range, automatically to enable two-way voice communication and to activate the alarm.

The device may comprise a location detector configured to determine the location of the device; and wherein the device is configured to transmit the determined location of the monitor device to the remote device in response to the measured environmental or user parameters going beyond a predetermined range.

The monitor device may be configured to send an alarm-mode signal to the remote device notify the remote device that the alarm of the monitor device has been activated.

The monitor device may be configured to enable (e.g. initiate) two-way communication with the remote device in response to a user interaction.

The communicator may be configured to enable two-way communication with any one or more of a plurality of remote devices; wherein the monitor device is configured to:
 determine which of the plurality of remote device is closest to the monitor device; and
 to activate two way communication with the closest remote device.

The monitor device may be configured to automatically activate two-way voice communication with a further remote device in response to an activation request for two-way communication with an initial remote device being rejected (e.g. the request being declined or timing-out).

The two-way communication may be provided via cellular radio.

The portable personal monitor device may be configured: to initiate two-way voice communication after a delay period in response to the alarm being activated if a deactivation command has not been provided by the user during the delay period.

The portable personal monitor device may be configured to:
 restrict two-way communication being initiated by the portable personal monitor device;
 transmit an alarm signal to a remote device;
 enable acceptance of two-way communication initiated by the remote device.

The remote device may be a remote server. The server may be monitored by a plurality of computing devices connectable to the remote server. This allows one alert on the server to be seen by multiple potential helpers via the computing devices. The remote server may be configured to store data received from the device in alert mode (e.g. including the two-way communication, threat data, location of user and/or time of threat being detected). The apparatus may be configured to restrict two-way communication being initiated by the portable personal monitor device for a period of time after detecting a threat.

The apparatus may be configured to enable multiple modes of voice communication.

The apparatus is configured to restrict two-way communication being initiated by the portable personal monitor device in response to detecting a threat.

According to a further aspect, there is provided a method comprising:
 measuring environmental or user parameters;
 notifying a user of a threat by initiating an alarm;
 in response to the measured environmental or user parameters going beyond a predetermined range, automatically enabling two-way voice communication with a remote device and to activate the alarm.

According to a further aspect, there is provided a remote device configured to enable two-way communication with each of a plurality of portable personal monitor devices; wherein the remote device comprises a controller configured to prioritize two-way communications from devices in an alarm mode.

The remote device may be configured to automatically record two-way communications with monitor devices which are in alarm mode.

The remote device may be a central server, cloud or other computer. The remote device (e.g. cloud) may make the information available at a variety of terminals (e.g. smartphone or computer via a log-in) via the internet.

According to a further aspect, there is provided personal monitor device, the device comprising:
 a location detector configured to determine the location of the device;
 one or more threat sensors configured to measure environmental or user parameters and to activate an alarm if the measured environmental or user parameters go beyond a predetermined range;
 a controller configured to associate one or more possible threats with one or more locations, wherein the controller is configured to provide an indication of the possible threats based on the determined location of the device.

The controller may be configured to notify the user if the one of more threat sensors are not configured to detect all of the possible threats associated with the determined location of the device.

The controller may be configured to associate a possible threat with a location based on one or more of:
 information received from a remote device; and
 detecting a threat at a particular determined location.

For example, if one device detected a $H_2S$, an $H_2S$ threat could be associated with that room and other detectors in the room without $H_2S$ sensors may immediately notify their users that they didn't have the right equipment.

The location detector may comprise: a GPS module. The location detector may be configured to use local fixed-point anchor-node signaling to determine location (e.g. fixed Wi-Fi points). The location detector may use cellular networks to determine location. The location detector may comprise an indoor positioning system (IPS).

The one or more threat sensor may be configured to sense one or more of the following environmental parameters: concentration of a particular gas; airflow; temperature of the environment; humidity; radiant heat; and light intensity.

The one or more threat sensor is configured to sense one or more of the following user parameters: motion of the user; orientation of the user; heart-rate of the user; time since user last initiated a report signal; and temperature of the user.

The device may be configured to activate and deactivate particular threat sensors based on the possible threats associated with the determined location.

At least one of the sensors of the device may be replaced with another sensor configured to measure a different environmental parameter; and the controller may be configured to recognize which environmental parameters can be measured by the attached sensors.

The device may comprise a two-way voice communication module.

The device may be configured to send an alarm signal to other users in the vicinity in response to an alarm being activated.

The remote device may comprise one or more of: a further portable personal monitor device; a central server.

The monitor device may be configured automatically to accept a two-way communication initiated by the remote device.

The monitor device may be configured to associate a particular threat with locations corresponding to an area or a volume.

The area or volume may be determined based on one or more of: distance to a particular location (e.g. the location where a threat has been detected); prevailing environmental conditions; physical barriers or impediments; and nature of the threat.

The monitor device may be configured to changing configuration settings based on certain parameters such as the determined location. This may include, for example, changing configuration settings based on certain criteria (moving from zone A to zone B, device location, time, driving, walking, etc.). For example, the portable monitor device may be configured to change modes based on the speed of the monitor exceeding or falling below a predetermined threshold (e.g. 15 kph corresponding to driving).

The controller may be configured to store an association between one or more possible threats with one or more locations in advance of a threat being detected in the one or more locations (e.g. by being associated manually or by automatic determination of the likely threats). For example, a user may manually associate a room with a gas line with the threat of that particular gas.

The controller may be configured to store an association between one or more possible threats with one or more locations independently of a threat being currently detected in the one or more locations.

The controller may be configured to store an association between one or more possible threats with one or more locations in response to a user interaction (e.g. a user entering an association between a location and a threat using a user interface such as a keyboard and screen).

According to a further aspect, there is provided a personal monitor device, the device comprising:

a gas sensor configured to measure the concentration of detectable gases in the environment of the monitor device;

a controller configured to:

store a relationship between the concentration of detectable gases and the concentration of one or more particular gases;

determine the concentration of the one or more particular gases based on the stored relationship and the measured concentration of detectable gases.

One of the particular gases may be benzene.

The detectable gases may comprise hydrocarbons.

The monitoring device may be configured to enable association of cumulative exposure data with a particular user.

The personal monitor device may be configured to associate the measured concentration of the gas with a particular user, and to transmit the measured concentration and user data to a remote device.

The monitoring device may be configured to store multiple relationships between the concentration of detectable gases with the concentration of one or more particular gases, and wherein the monitoring device is configured to determine which relationship to use in the concentration determination based on one or more of:

the location of the monitoring device;
the time; and
on the measured concentration of detectable gases For example, the detectable gases could be used as a fingerprint to determine the source of the gases. That is, the device may take a spectrum (using a spectrometer) of the detectable gases (e.g. IR spectrum). The device may compare this spectrum with stored spectra, the stored spectra corresponding to potential gas sources. The particular gas source can be identified in this way. Then the concentration of the one or more particular gases based on the identified gas source (e.g. it may be known that the gas line contains 0.1% vol. benzene but the tank contains 0.01% vol. benzene). The device may be configured to activate an alarm or otherwise notify the user and/or a central database or server when the cumulative exposure has exceeded a predetermined threshold.

The device may be configured to:

determine the cumulative exposure to the one or more particular gases by integrating the determined concentration over time; and provide an indication of the cumulative exposure.

According to a further aspect, there is provided a personal monitor device, the device comprising:

a gas sensor configured to measure the concentration of a gas in the environment of the monitor device;

determine the cumulative exposure to the gas by integrating the determined concentration over time; and provide an indication of the cumulative exposure.

According to a further aspect, there is provided a portable personal monitor device module, the device comprising:

a connector configured to receive a replaceable threat sensor module configured to measure environmental or user parameters and to transmit data via the connector;

a controller configured to:

receive alarm data from a connected sensor module indicative of the measured environmental or user parameters go beyond a predetermined range; and initiate an alarm in response to receiving the alarm data.

According to a further aspect, there is provided a portable personal monitor device module, the device comprising:

a connector configured to receive a replaceable threat sensor module configured to measure environmental or user parameters and to transmit data via the connector;

a controller configured to:

receive identification data from a connected sensor module;

transmit identification data to a remote server;

receive configuration settings from the remote server based on the identification data; and configure how data received from the connected sensor module is processed based on the received configuration settings.

According to a further aspect, there is provided, a portable personal monitor system, the system comprising:

one or more portable personal monitor devices each having:

a location detector configured to determine the location of the device and one or more threat sensors configured to measure environmental or user parameters and to activate an alarm if the measured environmental or user parameters go beyond a predetermined range; and a controller configured to:

associate one or more possible threats with one or more locations, wherein the controller is configured to provide an indication of the possible threats based on the determined location of the device; and determine an evacuation plan in response to an alarm being activated, wherein the evacuation plan is based on one or more of:

distance to a particular location; proximity of others; prevailing environmental conditions; physical capability of the users; physical barrier or impediment; and nature of the threat.

The evacuation plan may comprise one or more of: a muster location; and an evacuation route.

The controller may be configured to determine an evacuation plan corresponding to each of the portable personal monitor devices.

Each portable personal monitor device may be configured to convey the determined evacuation plan to the user by providing audio and/or visual guidance.

According to a further aspect, there is provided, a method comprising:

measuring environmental or user parameters;

in response to the measured environmental or user parameters going beyond a predetermined range, automatically enabling two-way voice communication and activating an alarm to notify the user.

According to a further aspect, there is provided, a method comprising:

determining the location of the device;

measuring environmental or user parameters activating an alarm if the measured environmental or user parameters go beyond a predetermined range;

associating one or more possible threats with one or more locations, providing an indication of the possible threats based on the determined location of the device.

According to a further aspect, there is provided, a method comprising:

measuring the concentration of detectable gases in the environment;

storing a relationship between the concentration of detectable gases and the concentration of one or more particular gases;

determining the concentration of the one or more particular gases based on the stored relationship and the measured concentration of detectable gases.

According to a further aspect, there is provided, a method comprising:

measuring the concentration of a gas in the environment of the monitor device;

determining the cumulative exposure to the gas by integrating the determined concentration over time; and providing an indication of the cumulative exposure.

According to a further aspect, there is provided, a method of providing an evacuation plan to one or more portable personal monitor devices each having:

a location detector configured to determine the location of the device and one or more threat sensors configured to measure environmental or user parameters and to activate an alarm if the measured environmental or user parameters go beyond a predetermined range;

the method comprising:

associating one or more possible threats with one or more locations, wherein the controller is configured to provide an indication of the possible threats based on the determined location of the device; and determining an evacuation plan in response to an alarm being activated, wherein the evacuation plan is based on one or more of: distance to a particular location; proximity of others; prevailing environmental conditions; physical capability of the users; physical barrier or impediment; and nature of the threat.

According to a further aspect, there is provided, a computer program comprising computer program code configured to, when run on a device:

enable measuring environmental or user parameters;

automatically enable, in response to the measured environmental or user parameters going beyond a predetermined range, two-way voice communication and activating an alarm to notify the user.

According to a further aspect, there is provided, a computer program comprising computer program code configured to, when run on a device:

enable determining the location of the device;

enable measuring environmental or user parameters enable activating an alarm if the measured environmental or user parameters go beyond a predetermined range;

enable associating one or more possible threats with one or more locations, enable providing an indication of the possible threats based on the determined location of the device.

According to a further aspect, there is provided, a computer program comprising computer program code configured to, when run on a device:

enable measuring the concentration of detectable gases in the environment;

enable storing a relationship between the concentration of detectable gases and the concentration of one or more particular gases;

enable determining the concentration of the one or more particular gases based on the stored relationship and the measured concentration of detectable gases.

According to a further aspect, there is provided, a computer program comprising computer program code configured to, when run on a device:

enable measuring the concentration of a gas in the environment of the monitor device;

enable determining the cumulative exposure to the gas by integrating the determined concentration over time; and enable providing an indication of the cumulative exposure.

According to a further aspect, there is provided, a computer program for providing an evacuation plan to one or more portable personal monitor devices each having:

a location detector configured to determine the location of the device and one or more threat sensors configured to measure environmental or user parameters and to activate an alarm if the measured environmental or user parameters go beyond a predetermined range;

the computer program comprising computer program code configured to, when run on a device:

enable associating one or more possible threats with one or more locations, wherein the controller is configured to provide an indication of the possible threats based on the determined location of the device; and enable determining an evacuation plan in response to an alarm being activated, wherein the evacuation plan is based on one or more of: distance to a particular location; proximity of others; prevailing environmental conditions; physical capability of the users; physical barrier or impediment; and nature of the threat.

In the context of the present disclosure, the terms and expressions used herein may be generally defined or described as follows.

A user may be, for example, one or more of the following:

a person working at home such as telecommuters, affiliated marketers, writers;

a person in the energy industry or oil and gas Industry including upstream workers like surveyors, land managers, drillers, and midstream or downstream workers such as refinery workers and drivers;

a construction worker;

a mobile worker such as traveling salesmen, truck drivers, health visitors, repair technicians;

a person who works in any type of manufacturing facility;

a person working outside normal hours such as security guards, cleaners;

people with ongoing or potential medical issues;

a utility worker such as meter readers or technicians;

a self-employed person; and

People who work apart from their colleagues such as receptionists, retail clerks, service station attendants.

A portable monitoring device may include one or more of: a gas sensor, processing circuitry, one or more motion or accelerometer sensors, one or more gyroscope or shock sensors, one or more two-way communication modules, one or more physiological sensors, one or more mode sensors, transmitter circuitry and receiver circuitry.

The device or system may comprise processing circuitry to calculate, assess and/or determine the environmental conditions of the user based on sensor data. The processing circuitry may include memory (for example, Flash memory, DRAM and/or SRAM) to store, and transmitter circuitry to send and receive information over the cellular, satellite or other such communication network, said sensor data and information which is representative of environmental conditions (for example, atmospheric carbon dioxide). The device, machine(s), processor(s) (suitably programmed) and/or field programmable gateways (or combinations of the aforementioned)) may be employed to calculate, determine, assess and/or determine the environmental risks for the user based on sensor data.

Sensors and networking circuits may include, for example, one or more accelerometers, gyroscopes, compasses, global positioning system receivers, short range wireless circuits which may include ANT or Bluetooth or other short range protocols, multicast wireless sensor, to calculate and/or detect the location of the user and transmit sensor data. Some devices are configured to use, for example, 3G and satellite wireless connections. This may mitigate the need for Wi-Fi networks, infrastructure and/or Bluetooth™ connections.

The device or system may be configured to enable the processes of calculating, obtaining, assessing and/or determining environmental conditions on or around the user based on certain sensor data. The device may be configured to determine threats based on multiple input parameters (e.g. detecting a raised heart rate and an oxygen-deficient environment).

The device or system may be configured to enable the processes for calculating, obtaining, assessing and/or determining communication methods and alerts initiated by or on behalf the user and/or a 3rd party based on certain sensor data, according to certain aspects of the present disclosure.

The device or system may be configured to enable the processes for calculating, obtaining, assessing and/or determining the environmental state of the user or surrounding the user based on sensor data, according to certain aspects of the disclosure.

The device or system may be configured to enable the processes of generating alerts based on pre-determined levels or sensor thresholds.

The device or system may be configured to enable the processes of two-way communication based on transmission or triggering of pre-determined levels or sensor thresholds.

The device or system may be configured to enable determining the state of the user by evaluating the sensor data.

The device or system may be configured to use interchangeable sensors.

The device or system may comprise a user interface. The user interface may include one or more output mechanisms (for example, a display and/or speaker) and/or one or more input mechanisms (for example, a microphone, and sensor and tactile gesture recognition sensor(s). The user may acknowledge input data and/or commands from sensor related data); notably, any manner of and/or mechanism for outputting and/or inputting of data and/or commands (for example, responses to, for example, queries) are intended to fall within the scope of the present disclosure.

The portable monitoring devices may include one or more gas sensors and a two-way communication modem, and wherein the circuitry determines user state. The portable monitoring device may also include one or more physiological sensors, one or more mode sensors, transmitter circuitry and/or receiver circuitry. For example, any portable monitoring device of the present disclosure may employ or be implemented in any embodiment where the processing circuitry is disposed to enable connectivity with external sources.

The portable monitoring device may be configured to disable or hide alerts/alarms under certain conditions (such as driving) automatically so that the user doesn't have to deal with them. The device may be configured to recognize these certain conditions based on one or more of: the location of the device, the time, and the speed of the device.

The portable monitoring device may comprise a single unit. The portable monitoring device may comprise multiple units in communication with each other. For example, the portable monitoring device may comprise a gas detector unit in communication (e.g. wireless communication such as Bluetooth®) with a portable electronic device with a controller and a transmitter (e.g. a mobile phone or laptop).

A portable monitoring device may comprise a controller comprising a processor and a memory having computer program code. A remote device may comprise a controller comprising a processor and a memory having computer program code.

Also encompassed within the present disclosure are corresponding methods for using the monitor devices and systems described above.

Also encompassed within the present disclosure are computer programs for configuring the monitor devices and systems described above to perform their functions. Such computer programs may be stored on non-transitory media such as CDs.

In some cases, it will be appreciated that this technology may be applied to fixed gas detectors in addition to portable personal gas detectors.

BRIEF DESCRIPTION OF THE DRAWINGS

Various objects, features and advantages of the invention will be apparent from the following description of particular embodiments of the invention, as illustrated in the accompanying drawings. The drawings are not necessarily to scale, emphasis instead being placed upon illustrating the principles of various embodiments of the invention. Similar reference numerals indicate similar components.

DETAILED DESCRIPTION

Introduction

Figure 1A:
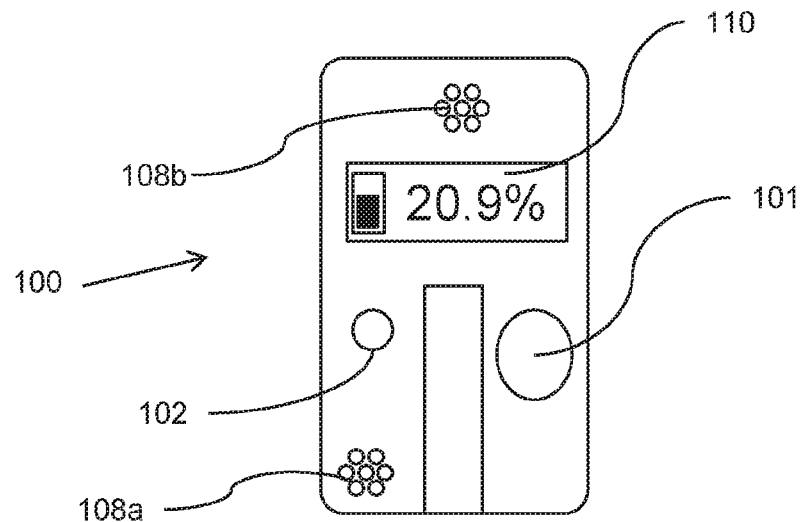
FIG. 1A is a front view of an embodiment of a portable personal monitor device.

Various aspects of the invention will now be described with reference to the figures. For the purposes of illustration, components depicted in the figures are not necessarily drawn to scale. Instead, emphasis is placed on highlighting the various contributions of the components to the functionality of various aspects of the invention. A number of possible alternative features are introduced during the course of this description. It is to be understood that, according to the knowledge and judgment of persons skilled in the art, such alternative features may be substituted in various combinations to arrive at different embodiments of the present invention.

Industrial chemicals leaked, spilled, or mishandled are common risks within environments such as manufacturing facilities. These facilities may have incorporated real-time gas detection monitors with man-down alarms. Such an industrial facility may provide monitoring capability of remote situations, in multiple locations, and across multiple platforms or geographies.

The inventors have recognized a need for improved monitoring systems to improve the detection of threats and to improve the ability for users and others to respond when a threat is detected. In the course of the detailed description to follow, reference will be made to the attached drawings. These drawings show different aspects of the monitoring systems and, where appropriate, reference numerals illustrating like structures, components, materials and/or elements in different figures are labeled similarly. It is understood that various combinations of the structures, components, and/or elements, other than those specifically shown, are contemplated and are within the scope of the present inventions.

Moreover, there are many aspects and embodiments of the technology described and illustrated herein. The present disclosure is neither limited to any single aspect nor embodiment thereof, nor to any combinations and/or permutations of such aspects and/or embodiments. Moreover, each of the aspects of the present inventions, and/or embodiments thereof, may be employed alone or in combination with one or more of the other aspects of the present inventions and/or embodiments thereof. For the sake of brevity, certain permutations and combinations are not discussed and/or illustrated separately herein.

Communications

An object of the present disclosure is to provide a two-way voice enabled dynamic gas detector which may be capable of being ported to any location and functionally operable out-of-the-box at any such location.

This aspect of the disclosure relates to portable gas detectors which incorporate two-way communication, such as M2M or machine to machine communications. The portable gas detector may include, in addition to one or more polymeric-type gas sensors, a singular or plurality of accelerometers, gyroscopes, temperature sensors, humidity sensors, and pressure sensors.

FIG. 1A shows a portable personal monitor device 100. In this case, the portable personal monitor device comprises a threat sensor 101 configured to measure environmental or user parameters. In this case, the threat sensor comprises an oxygen monitor. The level of threat is displayed on a display screen 110 of the monitor device 100.

It will be appreciated that other threat sensors may be configured to sense one or more of the following environmental parameters: concentration of a particular gas (e.g. toxic gases such as carbon monoxide, hydrogen sulfide, nitrogen dioxide); airflow; lower explosive limit (LEL); the temperature of the environment; the humidity; radiant heat; and light intensity.

It will be appreciated that other threat sensors may be configured to sense one or more of the following user parameters: motion of the user (e.g. to detect whether the user has stopped moving or is moving in an way indicative of a problem); orientation of the user (e.g. to detect if the user has fallen); heart-rate of the user; time since user last initiated a report signal; and temperature of the user.

Figure 1B:
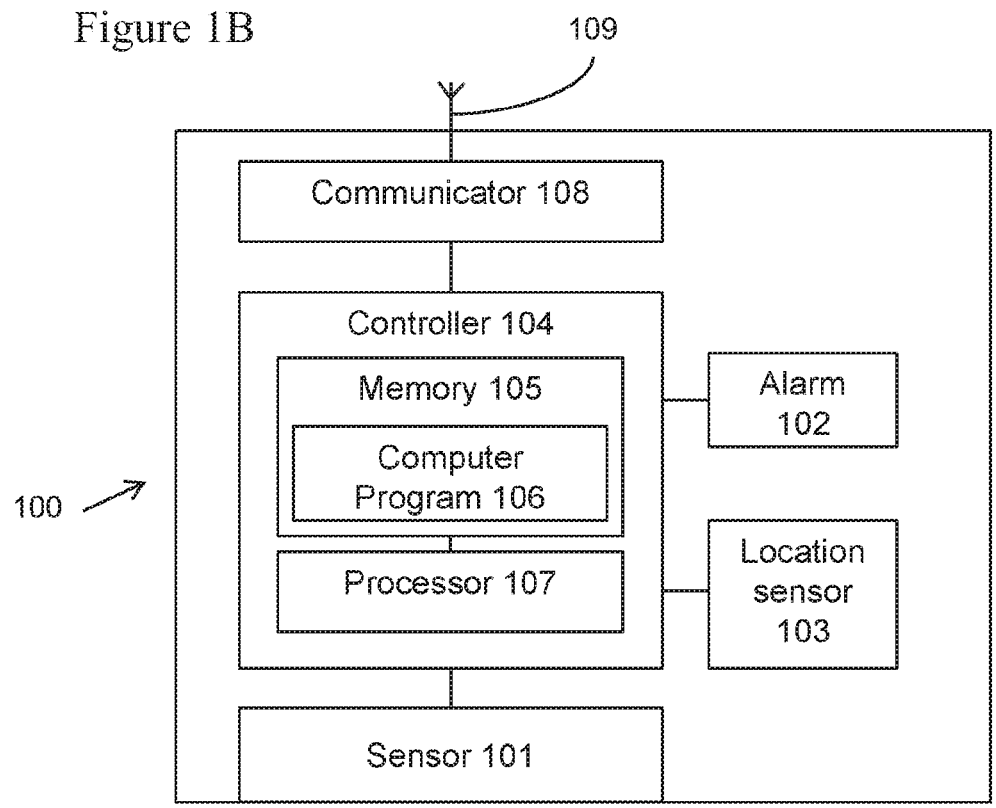
FIG. 1B is a schematic of the components making up the monitor device of FIG. 1A.

In this case, the sensor 101 is connected to a controller 104 (shown in FIG. 1B) comprising a processor 107 and a memory 105 having computer program code 106. The controller 104 is configured to activate an alarm 102 (in this case comprising a flashing light and an audio warning) if the environmental or user parameters measured by the sensor 101 go beyond a predetermined range. In this case, the alarm 102 is configured to be activated in response to the oxygen level being less than 20% (other values may be used such as 19.5%). Both upper and lower alarm levels may be set.

It will be appreciated that gas monitors may be configured to measure the relative amount of a gas in the atmosphere (e.g. as in this case where the oxygen level is reported as a percentage), or to measure an absolute amount of gas (this may be important in low pressure environments, such as at altitude, where the relative amount of $O_2$ is acceptable but the total available oxygen is deficient).

In this case, the personal monitor device also includes a communicator 108 comprising a microphone 108a and a speaker 108b configured to support two-way voice communication via a transceiver antenna 109 with a remote device (e.g. a remote server or another personal monitor device of a 'buddy' nearby).

The two-way voice enabled gas detector may be battery powered with extended lifetimes due to relatively low power requirements. Other embodiments may be configured to generate electricity (e.g. from solar panels). Additionally, it would be preferable if such detectors allow the user to manipulate the device in order to provide a proactive alert notification, while offering a relatively high degree of reliability so as to minimize false positives.

A connected gas detector with two-way voice and real-time sensor relays using a self-contained cellular communication module may help reduce or eliminate much of the required infrastructure to provide remote notification type of alarm monitoring. It also provides the wearer of the device the ability to articulate to an emergency response team. Furthermore, self-monitoring of the monitor devices may enable a remote site to know whether it is operating properly.

Of particular note, in circumstances where remote gas sensors are not connected to a hardwired infrastructure, over-the-air communication offers tremendous advantages. Such a compact and light weight safety monitoring system, capable of detecting atmospheric gas and/or other measures of sensor inputs, could be easily carried or worn by personnel in the area of interest, being the gas detector would be capable of operating without a fixed install. Transmitting data in real-time may allow the gas detector to remain connected regardless of the environment or location where it is being used.

Regarding the communication transceiver 109, there is a need for a gas detector that is robustly connected, allowing for it to freely and continuously send and receive voice and data over the air. In this case, the transceiver 109 is a cellular transceiver configured to connect to a cellular or mobile network (e.g. T-Mobile, AT&T, Verizon, etc.). This may help allow communications to be established while operating without local infrastructure constrains, such as Wi-Fi, telephone or internet cables. Other embodiments may use satellite infrastructure (i.e. Globalstar, Iridium, etc.), and geospatial technologies, (i.e. global positioning systems) or Wi-Fi, telephone or internet systems. Some devices may be configured to use local UHF radio frequencies. For example, the 33-centimeter or 900 MHz band is a portion of the UHF radio spectrum internationally allocated to amateur radio on a secondary basis. It ranges from 902 to 928 MHz.

In this case, the portable personal monitor device 100 is configured automatically to enable two-way voice communication in response to the alarm 102 being activated and/or the environmental or user parameters measured by the sensor 101 going beyond a predetermined range. For example, the monitor device 100 may automatically initiate the communication and/or automatically accept two-way communications initiated from a remote device. This would allow a remote person to check-in with the user of the portable personal monitor device 100 to assess the situation without the user having to take any specific actions. This may be important where the user has passed out or is otherwise incapacitated such that they are not able to initiate or accept the call themselves. It may also be important where the user's judgement is impaired due to the particular detected threat (as may be the case in oxygen deficient environments).

In this case, the monitor device 100 is configured to automatically activate two-way voice communication with a further remote device in response to an activation request for two-way communication with the first remote device being rejected. For example, if the monitor device 100 tried to call another user nearby but they are also suffering from the same threat they may not answer the call. When the two-way communication is declined or times-out, the monitor will automatically attempt to initiate a two-way voice communication with a different remote device. In other cases, an alert will be sent to the remote devices and the remote devices will be configured to initiate the two-way communication.

In this case, the device also comprises a location detector 103 configured to determine the location of the device 100. The device is, in this case, configured to transmit the determined location of the monitor device 100 to the remote device in response to the alarm being activated and/or the environmental or user parameters measured by the sensor 101 going beyond a predetermined range. This would allow the remote user to more quickly determine where the user is in order to facilitate a rescue if required.

It will be appreciated that the monitor device 100 may be configured to initiate a two-way communication (e.g. via cellular radio) with the remote device in response to a user interaction. That is, the monitor device may be configured to also operate as a conventional two-way communicator. In other embodiments, the ability for the device to operate as a conventional two-way communicator may be suppressed or deactivated when a threat is detected and the device is placed in a threat or alarm mode.

It will be appreciated that the monitor device 100 may be configured to activate the alarm 102 in response to a user interaction.

It will be appreciated that, in other embodiments, the monitor device may be configured to send an alarm-mode signal to the remote device notify the remote device that the alarm of the monitor device has been activated. This may allow the remote device to prioritize communications with devices in alarm-mode. The monitor device may also be configured to notify the remote device of the nature of the threat which activated the alarm. This may help the remote user to prepare to help (e.g. by bringing oxygen tanks to an oxygen deficient environment). This may be particularly important for embodiments with multiple threat sensors.

Regarding which remote device to initiate contact with, the monitor device may be configured to enable two-way communication with any one or more of a plurality of remote devices (e.g. a plurality of other personal monitors, a remote service, emergency services). In such cases, the monitor device may be configured (e.g. when the alarm is activated) to: determine which of the plurality of remote device is closest to the monitor device; and to activate two way communication with the closest remote device. This may be advantageous to reduce the time it takes for help to arrive by calling on the closest person. It will be appreciated that the monitor device may be configured to determine the closest remote device which is not also in alarm mode. This may help prevent the two-way communication being established with a remote user who is also not able to help.

In some embodiments, the portable personal monitor device may be configured to initiate two-way voice communication after a delay period in response to the alarm being activated if a deactivation command has not been provided by the user during the delay period. For example, a device configured to detect if a user has fallen over may generate too many false positives which may reduce the effectiveness of the system by initiating too many two-way communications when not needed. By providing a delay period (e.g. accompanied with an audio or visual alarm to the user), it would allow the user to cancel or deactivate the two-way communication thereby acknowledging that they are fine and happy to continue.

The remote device may be configured to automatically record two-way communications with monitor devices which are in alarm mode.

It will be appreciated that the system and devices described herein may allow the functioning of a sensor (e.g. for atmospheric gas) to be remotely monitored to ensure it is tested and calibrated. If the sensor or detector is not working properly, or is not calibrated, notification may automatically be provided to the end-user and to the monitoring network (e.g. via cellular or satellite communication, or other means of communication).

Embodiments described herein may help address the current need to ensure compliance of deployed calibrated and tested field units by triggering an alarm should a unit be used without proper calibration.

Some embodiments comprise a communication module that allows two-way communication from a communication center to the unit which involves feedback from the receiver to the sender. This allows the sender to know the message was received accurately by the receiver (e.g. by a copy of the whole or parts of the message being returned to the sender). For example, the message may be a distress call initiated by the person wearing the gas detector; or, it may be initiated autonomously by the gas detector based on pre-determined safety criteria (e.g. level of potentially hazardous atmospheric gas, fall detection, no-motion).

Upon any event taking place that triggers the gas detector to go into an active alarm, notification is relayed to a third party containing details of the alarm. For example, such detail may include the exceeded level of $CO_2$ gas in the user/wearer atmosphere, or a fall detected by triggering respondent mechanisms that measure physical stress, such as movement and gravitational force; or both. The alarm affirmation presents the opportunity for immediate real-time intervention. A unique serial number designated to the gas detector (e.g. corresponding to a "telephone number") allows a 3rd party to access the gas detector through a two-way voice enabled speaker phone. Such an attribute may be desirable as the user of the device may be unable to respond to the emergency due to their own physical or mental incapacity. Further, it allows the 3rd party to quickly assess the situation by having an "open mic" to the location of the injured.

In certain aspects the processing circuitry of the gas detector receives partially processed or "raw" sensor data. The processing circuitry partially or wholly calculates, assesses and/or determines the trigger values and elicits behavior based on the instructions updated over-the-air ("OTA") or shipped with the device, or both.

Figure 1C:
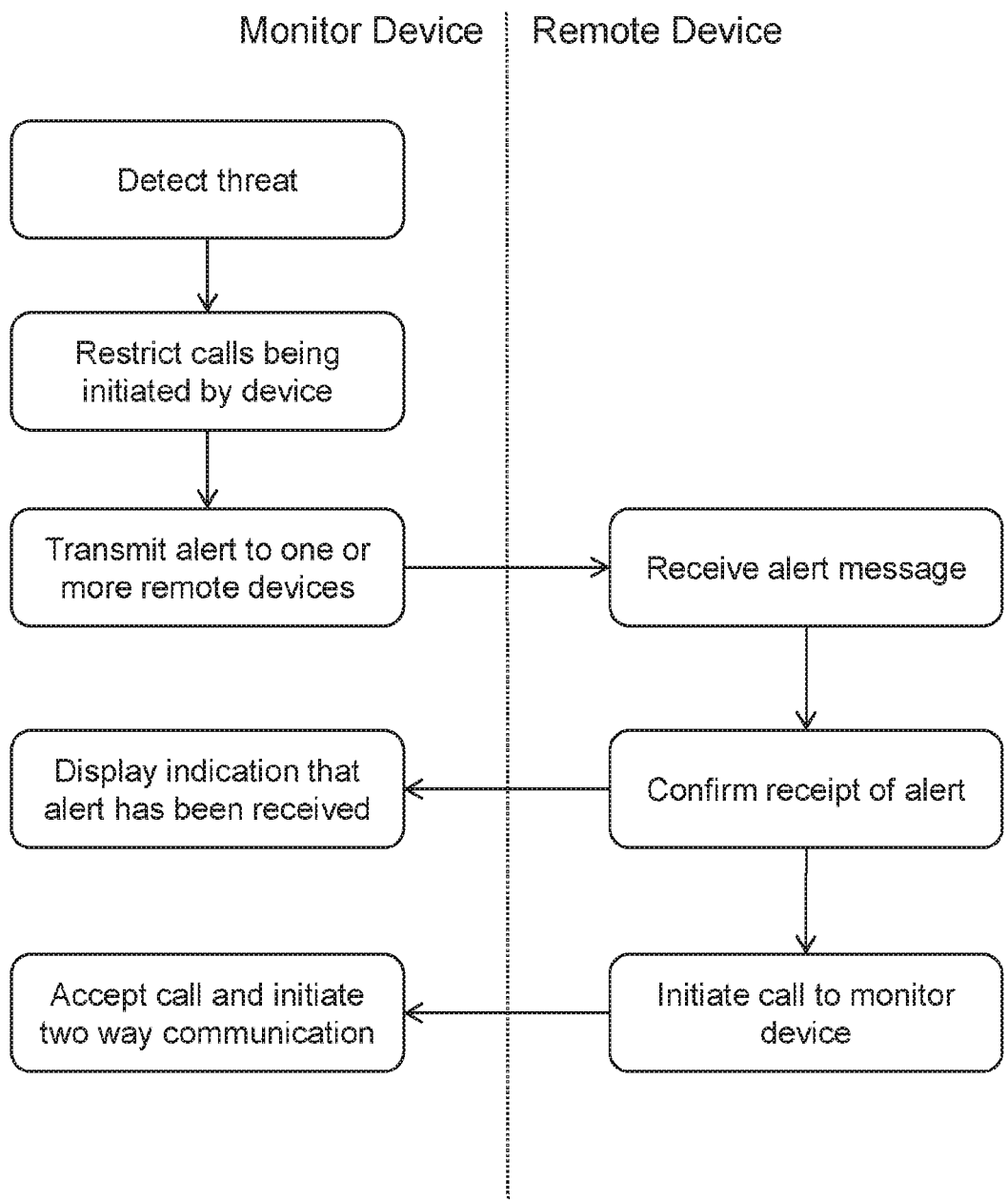
FIG. 1C is a flow chart showing how two-way communications can be established.

FIG. 1C shows a flow chart describing one way of providing two-way communications in response to the personal monitor device detecting a threat (e.g. such as the presence or absence of a gas or raised heart rate).

In this case, the portable monitor device may have a number of capabilities (some of which can be activated or deactivated) including:
the ability to detect a threat;
the ability to initiate a call;
the ability to receive a call; and
the ability to transmit an alert signal.

That is, the portable monitor device comprises a number of modes including a normal mode and a threat or alarm mode. These modes are distinguished by having different capabilities activated or deactivated in different modes.

In this case, in response to detecting a threat, the device is placed in a threat mode in which the ability to initiate a call is deactivated while the ability to receive a call is retained in an active mode. Although this may seem counter-intuitive, the natural reaction when an alarm is activated is for the user (or the device) to initiate a call to a particular person or device. While the user is attempting to initiate a call to a particular device, other potential responders may not be able to establish communications with the user to address their issue.

In addition to deactivating the ability to receive a call, the portable monitor device is configured to transmit an alert to one or more remote devices. In this case, the alert is transmitted via non-voice.

It may be preferable for the alert to be transmitted to multiple remote devices to ensure that the alert is responded to promptly. This can be achieved in a variety of ways. For example, the alert may be simultaneously broadcast to a number of remote devices. Alternatively, as in this case, one alert is transmitted to a central server. This central server is configured to be monitored by a plurality of end-terminals (which may be distributed across a wide geographical area—e.g. in Canada, US, Europe, Australia, New Zealand). When an alert is received by the server, this can be seen by any one of the end-terminals which are monitoring the server.

In this case, one of the end-terminals can interact with the server to claim responsibility for that particular alert. This may help prevent multiple remote devices which are aware of the alert from simultaneously attempting to resolve the alert. In this case, when the user of a remote device has claimed responsibility for the alert, a signal is transmitted to the portable monitor device confirming receipt of the alert. The portable monitor device may provide an indication to the user (e.g. an audio-visual indication) indicating that the alert has been received. For example, lights may flash a different colour on the device or a message may be displayed indicating the progress of the alert.

In this case, claiming responsibility for the alert also initiates a voice call from the remote device (in this case, either the server or the end-terminal) to the portable monitoring device associated with the alert. Because the portable monitoring device is configured in this alert mode only to receive calls, the call initiated from the remote device can be established thereby allowing two-way communication between the user of the portable monitoring device and the person responsible for dealing with the alert. The acceptance of the call may take place automatically. Although the call is accepted automatically, the device may be configured also to emit an audio noise associated with an incoming call (e.g. a ring tone) which stops only when acknowledged by the user (or a predetermined period of time has elapsed). This may help prevent the call being accepted unknowingly by the user (e.g. with the device in the user's pocket) which may impede the responder ascertaining the nature of the alert.

It will be appreciated that, in addition to restricting the initiation of calls, the portable monitoring device may be configured to control how, and from whom, calls are accepted in an alert mode. For example, the portable monitoring device may be configured to automatically accept calls when in an alert mode (e.g. without user input). This may be beneficial if the user is incapacitated or otherwise unable to interact physically with the device. Other embodiments may be configured to restrict which calls are accepted. For example, the portable monitor device may be configured in an alert mode only to accept calls from a restricted subset of devices. For example, the restricted subset of devices may comprise one or more of the following: a predetermined list of devices, devices to which the alert was transmitted and/or devices which have claimed responsibility for the alert (data relating to devices who have claimed responsibility may be transmitted to the monitor device in advance of the phone call being initiated).

It will be appreciated that the monitor device may only be configured to disable the call initiation function for a predetermined period of time. For example, the disabling of the call initiation function may be disabled for 1 minute after the alert is initiated. The call initiation function may be disabled for a further period of time (e.g. 1 minute) after receiving confirmation that the alert has been received. It will be appreciated that the duration of these periods of time may be dependent on the nature of the alert (e.g. the type of gas and the gas level). This may help ensure that the user can obtain help autonomously if the remote device does not provide help.

It will be appreciated that some embodiments may not have the capability to initiate calls. That is, the capability to initiate two-way communications may be restricted in response to the threat being detected or permanently restricted or unavailable. In some cases, the portable monitoring device may be configured only to receive calls when in an alert mode. That is, the ability to receive calls may be activated in response to detecting a threat.

Some embodiments may be configured to have multiple protocols for transmitting communications data. For example, one portable monitor device may be configured to enable cellular communication data and to transmit data files of recorded voice messages. One or both of the different voice protocols may be disabled (or enabled) when a threat is detected. For example, the cellular communications may be reserved for alert situations, while data file communications may be used for normal day-to-day communications to increase productivity. In data file communications, packets of data may be sent between devices.

When in an alert mode, two-way communications may be recorded and associated with that alert. When in an alert mode, threat data (gas levels, heart rate etc.) may be recorded and associated with that alert. When in an alert mode, user data and alert data (e.g. location data, time stamps) may be recorded and associated with that alert. This type of data may be stored by the personal monitor (e.g. similar to a black-box flight recorder) and/or at the remote device.

Threat/Location Device

Figure 2:
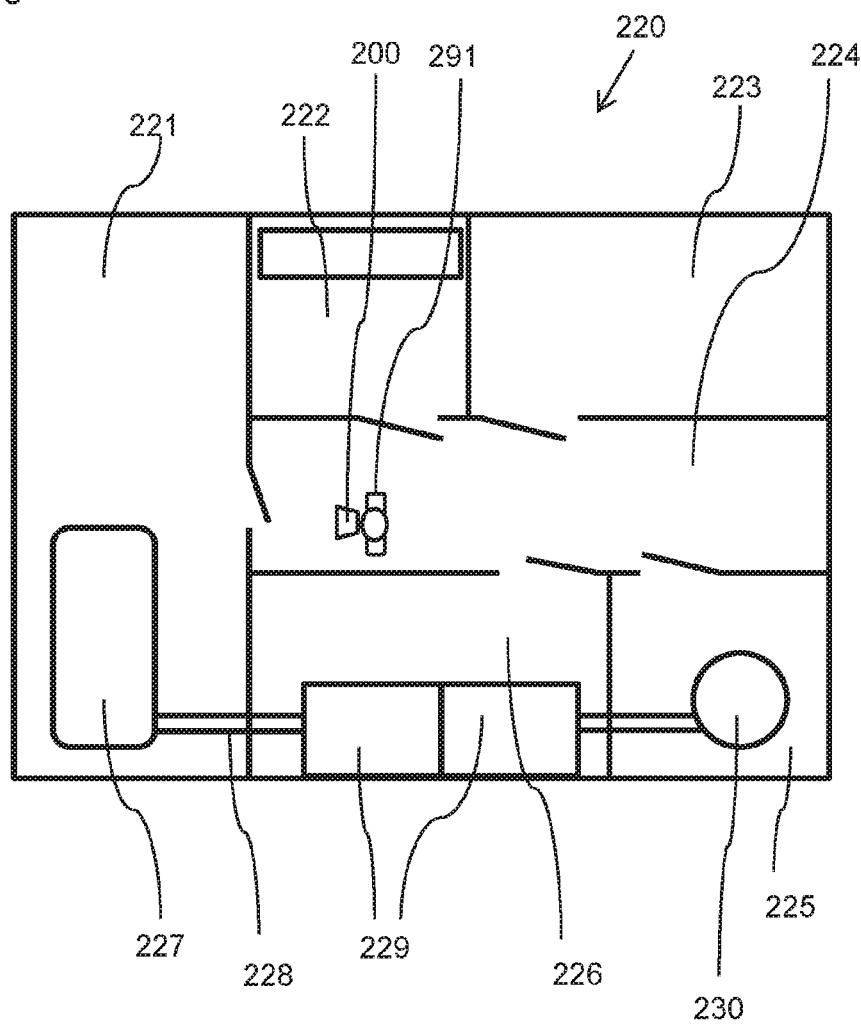
FIG. 2 is a plan view of a laboratory complex with a variety of possible threats.

FIG. 2 shows a representative building complex 220 having a number of possible threats and a user 291 of a portable personal monitor device 200 (e.g. such as the embodiment of FIG. 1A). In this case, the building is a laboratory complex 220. The device in this case comprises a location detector (e.g. GPS module) configured to determine the location of the device; one or more threat sensors configured to measure environmental or user parameters and to activate an alarm if the measured environmental or user parameters go beyond a predetermined range; and a controller configured to associate one or more possible threats with one or more locations, wherein the controller is configured to provide an indication of the possible threats based on the determined location of the device.

It will be appreciated that personal monitor devices configured to associate possible threats with the determined location of the device may or may not also allow two-way communication.

The building in this case is a laboratory complex having multiple rooms 221-226 including a well ventilated central hallway 224, two offices 222-223, a storage room 221 holding a supply of natural gas 227, a furnace room 225, and a laboratory 226 having two fume hoods 229.

In this case, the threats in the rooms 221-226 are different. For example, the storage room 221 contains the natural gas supply 227. Therefore the controller of the device is configured to associate the locations within this room 221 with the possible threat of natural gas.

The furnace room 225 is configured to burn the natural gas in a furnace 230 to produce heat, so the controller of the device in this case is configured to associate the locations within the furnace room 225 with the possible threats of natural gas (e.g. if the furnace flame is extinguished but the gas supply is not stopped) and carbon monoxide (e.g. if the furnace is not completely combusting the natural gas). It will be appreciated that other embodiments may also be configured to sense carbon dioxide (e.g. if the furnace flue is blocked) and/or low oxygen levels.

In addition to the threats associated with natural gas combustion (as the fume hoods have gas taps), the laboratory 226 is also associated with possible threats associated with chemicals used within the fume hoods 229 or otherwise present in the laboratory. In this example, the laboratory is associated with the threat of formaldehyde which is being used in the fume-hood.

In this example, the monitor device comprises a plurality of threat sensors including a natural gas sensor, and a carbon monoxide sensor.

As the user enters and moves through the laboratory complex 200, they can freely move through the well ventilated hallway and into the adjoining offices 222-223 as these rooms are not associated with any threats.

When the user approaches the storage room 221 or the furnace room 225 the device is configured to determine whether the device is configured to detect all the threats associated with these locations. In this case, the device is configured to detect all the threats associated with these rooms so an alarm may not be sent to the user or to a remote device. It will be appreciated that the device may be configured to notify the user of the threats and that the device is configured to detect these threats.

When the user approaches the laboratory 226, the controller is configured to determine that the sensors available to the monitor device are not adequate to detect all of the threats associated with this location. In particular, in this case the current configuration of the monitor is such that it cannot detect the possible formaldehyde threat associated with the laboratory 226. In this case, the controller is configured to notify the user if the one of more threat sensors are not configured to detect all of the possible threats associated with the determined location of the device.

It will be appreciated that threats may be associated with locations within a particular room and with an area outside the room (e.g. around any means of entry such doors and windows) so that the user can be warned in advance of possible threats.

In this case, the controller of the monitor device is configured to associate a possible threat with a location based on information received from a remote device (e.g. a central server). It will be appreciated that other devices may be configured to associate a possible threat with a location based on another device detecting a threat at a particular determined location. For example, if one device detected $H_2S$ nearby, an $H_2S$ threat could be associated with that area and other detectors in the area without $H_2S$ sensors would immediately notify their users that they didn't have the right equipment. Similarly, if a device had detected a particular threat in the past, that threat may be associated with that location even if the particular past threat event had been closed (e.g. the threat had ceased).

Other embodiments of the device may be configured to activate and deactivate particular threat sensors based on the possible threats associated with the determined location. For example, the device may be configured to deactivate the carbon monoxide sensor when not in the laboratory complex or within the halls or offices to help lengthen battery life. It will be appreciated that the deactivation of one or more of the sensors may be overridden by the user or by a remote device. Other embodiments may allow one or more of the sensors to be placed in a low-activation mode based on the location. For example, when in the hall, the natural gas sensor may be configured to monitor the natural gas level periodically (e.g. once every 5 minutes) rather than continuously. This may help detect unexpected threats whilst maintaining battery capacity.

Other embodiments may be configured to allow at least one of the sensors of the device to be replaced with another sensor configured to measure a different environmental parameter. In such embodiments, the controller may be configured to recognise which environmental parameters can be measured by the attached sensors. For example, each sensor may be configured to send an identifying signal to the controller in response to being connected to the monitor base unit.

Other embodiments of the device may be configured to send an alarm signal to other users in the vicinity in response to an alarm being activated.

The monitor device may be configured to associate a particular threat with locations corresponding to an area or a volume. The area or volume is determined based on one or more of: distance to a particular location (e.g. if a gas source is outside, the threat may be associated with a particular distance from the gas source); prevailing environmental conditions (e.g. if there is airflow, a gas threat may extend further downwind than upwind); physical barriers or impediments; (e.g. gas might fill a room defined by floor, walls and ceiling); and nature of the threat (e.g. heavy gases may be associated with volumes at the bottom of a room and light gases with volumes at the top of the room).

Other embodiments of the monitor device may be configured to change configuration settings based on the determined location, time or device speed (e.g. the device may automatically be deactivated when the speed of the device is greater than 10 kph which may be indicative of driving). For example, the sensors activated may change as the user moves from the storage room to the furnace room.

Other embodiments may be configured to change threat thresholds based on location. For example, if a particular room is associated with carbon dioxide, the threshold associated with a carbon dioxide threat may be lowered when the device is within, or close to, that room.

Other embodiments may be configured to control access to locations based on the particular location and the capabilities of the device. For example, the portable monitor device may comprise a transmitter which sends an unlocking signal to open a door to gain access to enter a particular room. The monitor device may only allow the unlocking signal to be transmitted if the portable monitor device is configured to detect all the threats associated with the room. For example, if the room is associated with a CO threat, and the monitor device does not currently have a carbon monoxide monitor module, then the device may be configured to prevent the unlocking signal being transmitted. If the user then inserts a carbon monoxide monitor module, then the unlocking signal may be enabled to allow the user to open the door and enter the room. It will be appreciated that the doors in this system may be configured to be openable from the inside of the room associated with the threat to allow easy exit regardless of equipment. In other embodiments the unlocking signal may be associated with a particular user. For example, a user who has exceeded a cumulative dose may be prevented from entering a location associated with a threat which could increase the cumulative dose. Or if a user has not been trained to deal with the threat associated with the location or have sufficient clearance to be in a particular area, the code may prevent access to that individual.

In some embodiments, when a threat is detected within a controlled access location (e.g. with doors), the locks may be disengaged (e.g. in response to a communication from the portable monitors and/or from a remote device in communication with the portable monitor). This may help allow responders to gain access in an alert situation.

Embodiments may be configured to not only to detect the presence of particular threat sensors, but also the status of the threat sensors. For example, the portable personal monitor may be configured to determine whether the battery life is low and/or whether the sensor inspection has expired. This information may inform whether or not the one of more threat sensors are configured to detect all of the possible threats associated with the determined location of the device.

Low-Level and Chronic Threat Detection

Some threats, such as radiation and some chemicals are associated with long-term exposure risks. That is, rather than the threat being dependent on the prevailing conditions at a particular point in time, the threat can be the result of accumulated exposure to a particular threat over an extended period of time. A particular chronic threat is benzene (and other aromatic compounds) which is a dangerous gas that can cause long-term health risks.

In addition, some gases, such as benzene, are difficult to detect in a portable monitor. Therefore, the inventors have recognized a need to allow the concentration of benzene (and other aromatic compounds) to be monitored.

Figure 3:
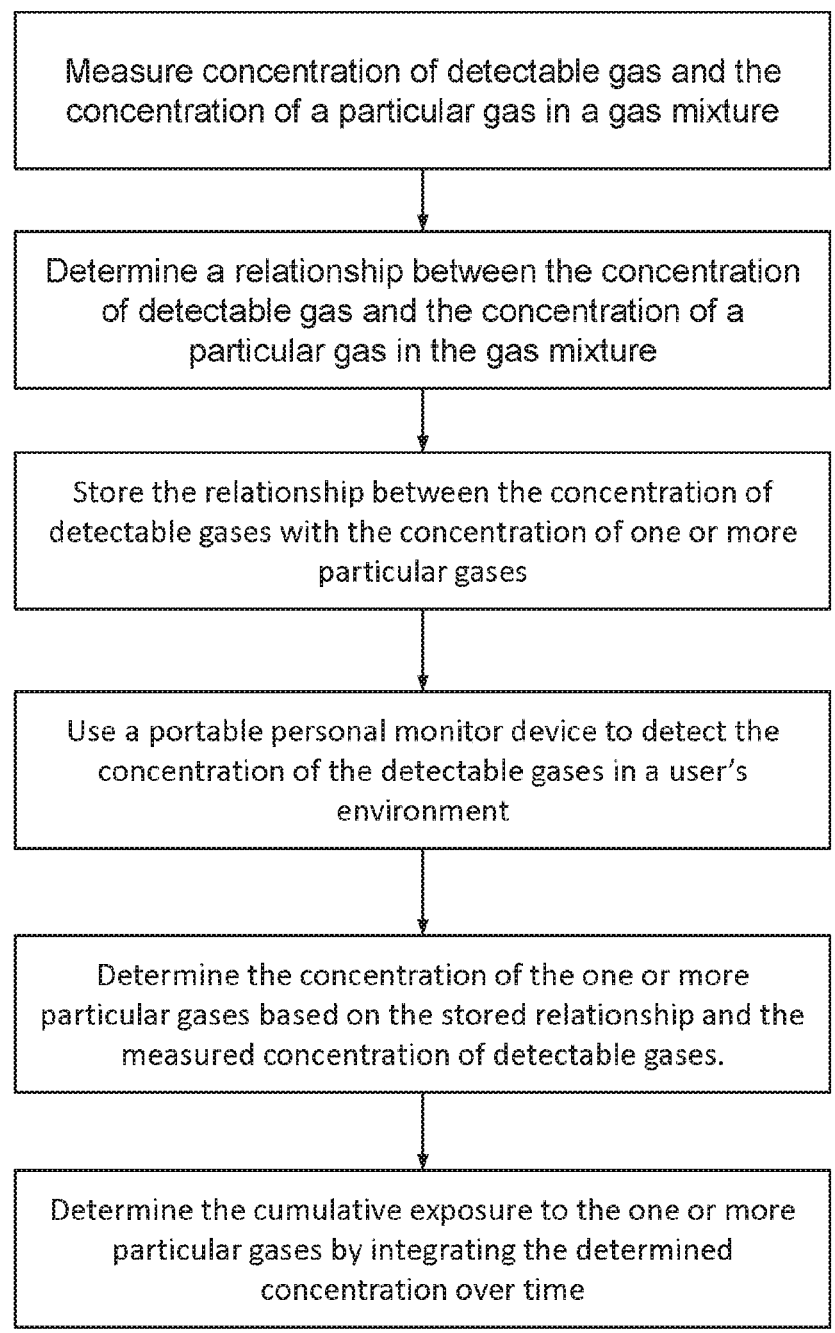
FIG. 3 is a flowchart showing how the cumulative exposure to a particular gas is determined based on the measurement of a detectable gas.

In the flowchart shown in FIG. 3, the concentration of benzene is monitored indirectly by correlating a gas chromatograph survey of the potential gas source with the response of a broad range NDIR/Pellistor hydrocarbon sensor allows the estimation of benzene or other components of interest in the mixture. Further, a pellistor sensor can be run in a mode where at various temperatures individual gas types can be measured ensuring what is being measured matches the predetermined benzene content. That is, the detectable gases in the mixture may be measured as a proxy for determining the concentration of a particular gas within the mixture.

That is, the system in this case is configured to have the ability to empirically set or determine a relationship between a measureable parameter and a target gas or gases. For example, if it can be determined empirically that a particular feedstock has a 2 ppm benzene content in the air when the LEL reading is 25% LEL, we can accumulate a benzene reading as the LEL is measured. Benzene is typically detected either with PID sensors or with "tubes" made by Drager or MSA. The idea is that a person can measure the LEL and Benzene content in a particular feedstock, enter that relationship into the web portal, and the portal will enable the device (or the portal) to determine the benzene concentration based on the device measurement. Readings may be based on lower explosive limit and/or lower exposure limit.

This method allows for various gas mixes to be cataloged. In other words, the gas chromatograph survey allows the quantity of benzene (or other particular gas) within a potential gas source (e.g. a hydrocarbon mixture) to be correlated with the response of a particular gas threat sensor (e.g. configured to detect hydrocarbons in general). Therefore, if there has been a leak from the potential gas source, the quantity of benzene can be determined from the amount of hydrocarbons detected in the air. It will be appreciated that the correlation may take into account the differing volatilities of the different chemicals in the mixture.

In this case, the portable personal monitor device module (such as that depicted in FIG. 1), may be configured to store a relationship between the concentration of detectable gases (e.g. hydrocarbons in general) with the concentration of one or more particular gases (e.g. benzene) in the memory.

In this case, the personal monitor device module also comprises a gas sensor configured to measure the concentration of detectable gases in the environment of the monitor device. The gas sensor may comprise an IR sensor or a pellistor sensor.

When the device detects a level of detectable gases, the controller (which may be housed in the portable personal monitor device) is configured to determine the concentration of the one or more particular gases based on the stored relationship and the measured concentration of detectable gases.

By monitoring the detectable gases over time, the controller can thereby determine the cumulative exposure to the one or more particular gases by integrating the determined concentration over time; and provide an indication of the cumulative exposure.

In this case, the device is configured to activate an alarm when the cumulative exposure has exceeded a predetermined threshold. For example, the device may activate an audio and/or visual alarm to notify the user and/or send an alarm signal to a remote device.

In this case, the monitoring device is configured to allow the cumulative data to be associated with a particular user. For example, the user may enter a code or key identifying the user when activating the monitor device. Whilst this key is being used, the cumulative data will be associated with that user. When a new user enters their code, subsequent exposure of the monitor device to the threat will be accumulated to the new user. This may allow the same device to be used by different users. It will be appreciated that, in other embodiments, the association of the user with the cumulative exposure may be made at a remote device (e.g. a server receiving data from the personal monitor device).

In other embodiments, the user may be identified by the user selecting a name from a list displayed on the device or entering a unique PIN associated with the user. In other embodiments, a computer may scan an identification document (e.g. badge) and the device to associate collected data from that device with that user (e.g. until another association is made). This allows data collected from multiple sequentially-used monitor devices to be associated with the same user.

In other embodiments, the monitoring device is configured to store multiple relationships between the concentration of detectable gases with the concentration of one or more particular gases, and wherein the monitoring device is configured to determine which relationship to use in the concentration determination based on one or more of: the location of the monitoring device; the time; and on the measured concentration of detectable gases.

For example, regarding the location, the device may be configured to recognise that in a first location (e.g. a first room) a gas source with 0.1% benzene is stored, whereas in another location (e.g. a second room) a gas source with 0.2% benzene is stored. Then, when gas is detected in the first room, the device may be configured to add cumulative exposure to benzene at a rate of 0.1% of the total detectable gas exposure whereas if the gas were detected by the monitor device in the second room, the cumulative exposure would be added at a rate of 0.2%.

Regarding the measured concentration of detectable compounds, the device may be configured to use the detectable gases as a fingerprint to determine the source of the gases. For example, if one source was a propane source with 0.2% benzene, and another source was ethyne with 0.01% benzene, the device may be configured to identify the proportion of benzene present in the gas based on the identity of the detectable gas or gases. That is, if the sensor recognised that the detectable gas was propane, the controller would be configured to infer that benzene may be present in the gas at a rate of 0.2%.

Modular Sensors

Figure 4A:
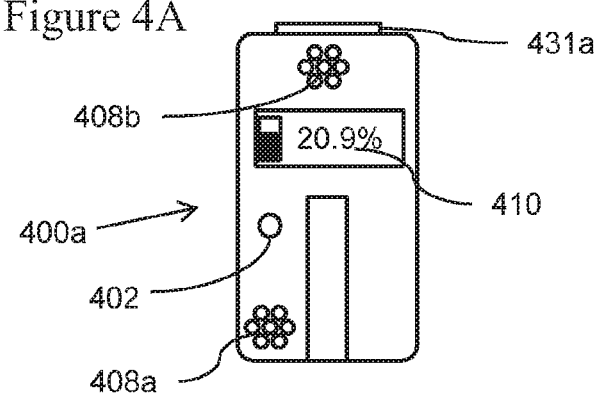
FIG. 4A is a front view of an embodiment of a base module for a portable personal monitor device.
Figure 4B:
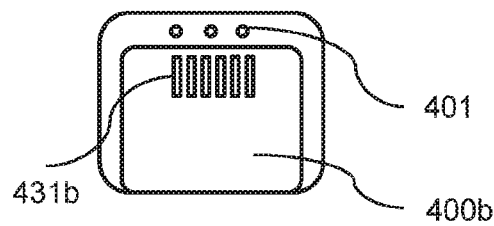
FIG. 4B is a front view of an embodiment of a sensor module for a portable personal monitor device.

FIGS. 4A-4B illustrate a modular monitor device which can be used with replaceable sensor modules.

FIG. 4A depicts portable personal monitor device base module 400a, the device comprising: a base connector 431a configured to receive a replaceable threat sensor module configured to measure environmental or user parameters and to transmit data via the connector 431a; a controller (shown in FIG. 4D) configured to: receive alarm data from a connected sensor module indicative of the measured environmental or user parameters go beyond a predetermined range; and initiate an alarm in response to receiving the alarm data.

FIG. 4B shows a corresponding sensor module 400b comprising a sensor 401 configured to measure environmental or user parameters; and a sensor connector 431b configured to facilitate transmission of the data from the sensor to the monitor device base module 400a. The connector 431b may be common across a plurality of different sensor modules to allow the same base module 400a to be used with, for example, an oxygen sensor and then a $H_2S$ sensor.

Figure 4C:
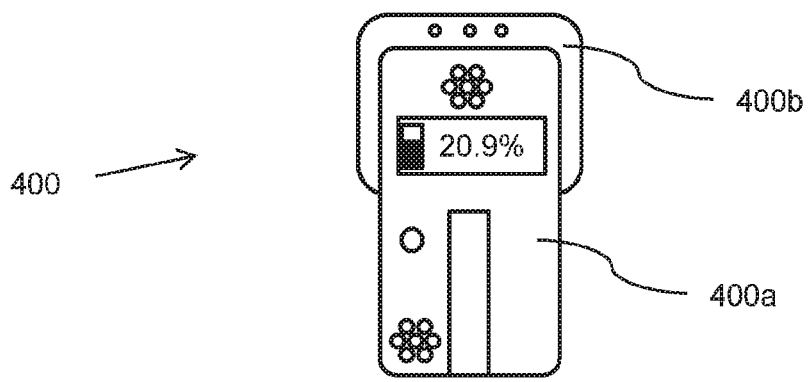
FIG. 4C is a front view of an embodiment of a monitor device comprising the base module of FIG. 4A and the sensor module of FIG. 4B.

FIG. 4C shows the base module 400a attached to the sensor module 400b thereby forming a complete monitor device 400.

Figure 4D:
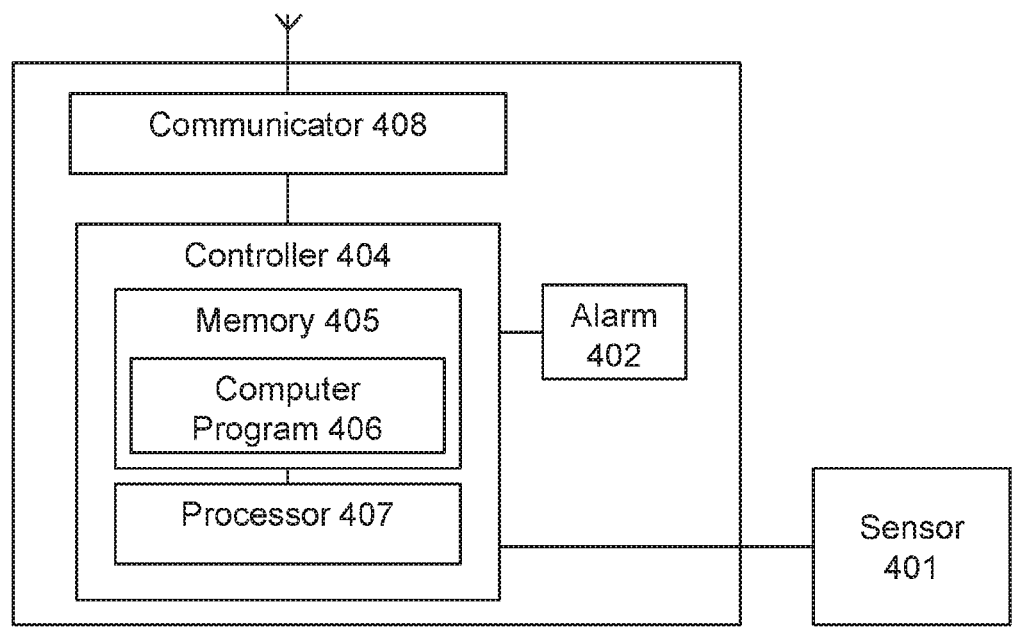
FIG. 4D is a schematic of the components making up the monitor device of FIG. 4C.
Figure 4E:
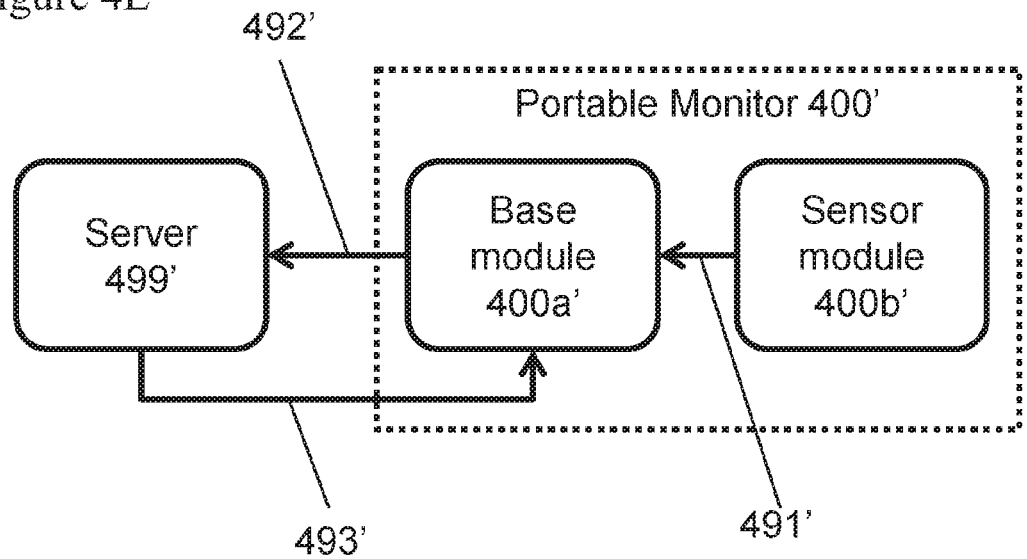
FIG. 4E is a schematic of how information is transferred between the monitor device of FIG. 4C and a remote device.

FIG. 4D is a schematic of the various components of the base and sensor modules shown in FIG. 4C.

In this case, the sensor module 400b is configured to store a threat code associated with the particular threat that the sensor 401 is configured to detect. This is transmitted to the base module 400a when the sensor module 400b is attached to the monitor base module 400a. That is, the base module 400a is configured recognize what kind of sensor has been attached based on the threat code data transmitted from the sensor module. It will be appreciated that data associated with the predetermined range associated with a particular threat may be stored in the sensor module and/or in the base module.

The sensor module may store one or more of the following: sensor type, cartridge serial number, sensor calibration information (e.g. last calibration date, calibration sensitivity, temperature compensation data). The sensor module may communicate serially to the main unit.

FIG. 4D shows an alternative configuration. In this case, the base unit 400a' is in two-way communication with a remote device 499' such as a server. When the base module 400a' is attached to a sensor module 400b' to form a portable monitor device 400', it receives identification information 491' from the sensor module (e.g. a serial number). It then transfers 492' this information to the remote device.

The remote device determines the type of sensor based on the received serial number in this case. The remote device may store associations between one or more of: sensor serial numbers and sensor types, base unit serial numbers and users; base unit serial numbers and user type (e.g. company, role within a company such as engineer, visitor).

Based on the received information, the remote device can then transmit 493' configuration settings back to the monitor device based on the identified sensor module. The remote device may also establish configuration settings based on the type of base unit and the user associated with the monitor device. The configuration settings may dictate how a threat is dealt with by the monitor device. The configuration settings may include threat thresholds (e.g. values which can be used by the monitor device to determine whether an alert or alarm should be initiated). The configuration settings may relate to which remote device is contacted for one or more threats. The configuration settings may comprise unlock codes corresponding to access points (e.g. doors) which the monitor device can provide to unlock those access points. That is, the remote server may recognise that the user of a device has had $H_2S$ training and is now equipped with an $H_2S$ monitor, and provide the codes to unlock locations associated with an $H_2S$ threat. The monitor device may be configured to receive the configuration settings and to configure itself based on the received configuration settings to control how it deals with threats.

Allowing the remote device to control the settings of the device allows for greater flexibility. For example, it may allow the server to set different gas thresholds for different people even though they are using the same gas sensor module. In another case, the device may be configured to activate particular threat-detecting capabilities based on the information received from the monitor device and/or information stored on the remote device. That is, particular threat protocols may be determined for individuals, companies, particular tasks, and particular locations. It may also allow the protocols to be readily remotely updated (e.g. in response to an update in threat policy, or a contracting firm going to a new job site with different protocols) across a wide range of people without having to interact directly with each portable monitor itself.

Dynamic Muster

It is common practice for an evacuation route and muster point to be established in advance. For example, in an apartment building, there may be signs indicating the escape route for individuals in particular apartments (e.g. taking stairs and avoiding lifts) which guide the individuals to particular pre-determined muster points. This works well where there are predicable risks such as in an apartment where the likely threat is fire.

In other situations, the particular threat combination may be difficult to predict. For example, in a laboratory or industrial setting there may be many possible threats (e.g. fire, gases, liquid spillages). The inventors have realised that there is a need to determine the evacuation plan dynamically based on data once the threat or threats have been identified. The evacuation plan may also be tailored to the individual's location or situation to help guide them to safety.

Figure 5:
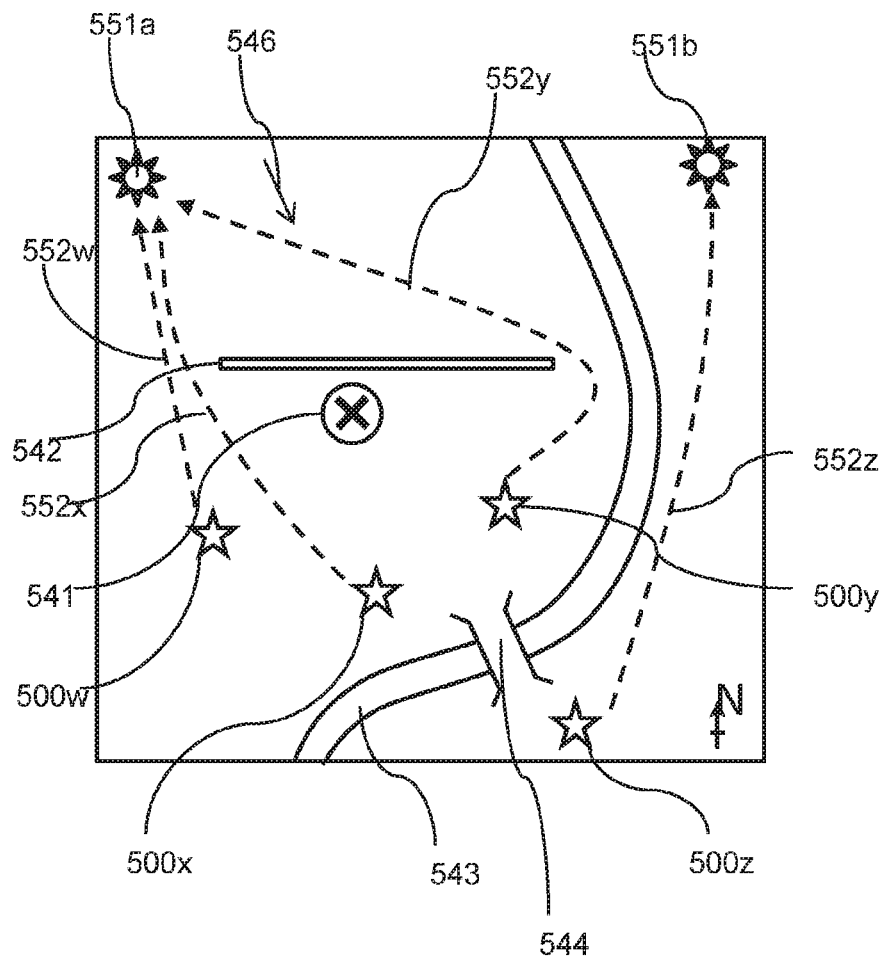
FIG. 5 is a plan view of an industrial complex with a threat and a number of determined evacuation plans.

FIG. 5 shows an overhead view of a portable personal monitor system deployed in the field. For example, this may be the view displayed on a remote device in communication with the portable personal monitors deployed in the field. In this case, the system comprises: one or more portable personal monitor devices (in this case four monitor devices $500w$-$z$, each indicated by a star) each personal monitor device having: a location detector configured to determine the location of the device and one or more threat sensors configured to measure environmental or user parameters and to activate an alarm if the measured environmental or user parameters go beyond a predetermined range.

In this case, the system also comprises a controller (not shown), the controller configured to: associate one or more possible threats with one or more locations, wherein the controller is configured to provide an indication of the possible threats based on the determined location of the device; and determine an evacuation plan in response to an alarm being activated. In this case, the controller is located in a remote server which is in communication with all of the plurality of portable personal monitor devices of the system. It will be appreciated that, in other embodiments, the controller may form part of one or more of the portable monitor devices themselves.

In this case, the environment in which the system is deployed comprises a gas storage tank 541, a wall 542, and a river 543 which is crossable via a bridge 544. The current prevailing wind 546 in this example is from the northwest. Information relating to the current conditions may be obtained from the portable monitor devices and/or fixed monitor devices (e.g. a fixed weather station).

In this case, the storage tank 541 houses natural gas. Each of the monitor devices 500$w$-$z$ comprises sensors configured to detect natural gas.

In the situation in FIG. 5, one of the portable monitor devices 500$x$ has detected a level of natural gas which is above the predetermined range. This causes an alarm to be activated. The data relating to the alarm and to the detected level of natural gas at the first portable electronic device position is sent to the controller.

In response to receiving the alarm activation signal, the controller is configured to determine an evacuation plan for each of the portable monitor devices 500$w$-$x$ within a predetermined range of the natural gas source. It will be appreciated that, in other embodiments, an evacuation plan may be determined for each of the portable monitor devices within a predetermined range of the monitor device which activated the alarm.

In this case, each evacuation plan is based prevailing environmental conditions; physical barriers; and nature of the threat. In this case, the nature of the threat is a natural gas which may be damaging to inhale and may ignite and cause a fire. Such a gas will be blown towards the southeast by the prevailing wind. Based on this information, the controller determines that each user of a portable monitor device 500$w$-$z$ should move to a safe muster point a predetermined distance upwind from the threat source (the natural gas storage tank 541).

How the threat is distributed (e.g. the risk as a function of location) may be calculated using a model (e.g. how a gas would move for particular wind conditions). The model may take into account the topography of the area including physical barriers and/or the threat readings from each of the monitoring devices in the area (e.g. whether or not the readings are beyond the predetermined range).

In this case, the evacuation plans comprise a muster location 551$a$-$b$ and an evacuation route 552$w$-$z$ for each monitor device 500$w$-$z$. In calculating a route 552$w$-$z$, the controller takes into account the cumulative risk of all the positions along the route. So for example, the users of the first and second monitor devices 500$w$-$x$ are guided towards the first muster point along fairly straight routes 552$w$-$x$. In this case, each portable personal monitor device 500$w$-$z$ is configured to convey the determined evacuation plan to the user by providing audio (e.g. a series of commands) and/or visual guidance (e.g. a map and route, direction indicators or text commands).

The closest route to the first muster point for the user of the third monitor device 500$q$ would be to go around the wall at the same end as the users of the first and second monitor devices. However, this would involve going directly downwind of the natural gas source. Therefore, taking the physical barriers (e.g. the wall) into account, the controller guides the user of the third monitor device along the longer but safer route 552$y$ around the other end of the wall to the first muster point.

Regarding the user of the fourth portable monitor device 500z, the controller recognises that the physical barrier of the river 543 means that the user of the fourth portable monitor device can only access the first muster point 551a via the bridge 544. However, the bridge 544 is also downwind of the natural gas threat source 541. Therefore, the controller guides the user of the fourth portable monitor device 500z towards a second muster point 551b.

It will be appreciated that using dynamic muster points helps ensure that a safe location is chosen based on the specific detected threat. It will also be appreciated that, because the location of the monitor devices can be captured remotely, it is not necessary that all personnel congregate at the same muster point. That is, multiple muster points can be established and monitored based on the location of the portable monitor device positions in the field.

It will be appreciated that other embodiments may be configured to base the evacuation plan on one or more of: physical capability of the users; distance to a particular location (e.g. to the treat source and/or to a possible muster point); and the proximity of others.

The system may be configured to monitor the position and location of one or more of the monitor devices within a threat zone. The system may be configured to identify monitor devices which have not reached the muster point and/or monitor devices which are travelling a speed below a certain threshold (e.g. are not moving); and or monitor devices which are not moving towards the muster zone (e.g. to identify personnel without the correct equipment attempting to save colleagues).

Zone Based Monitoring

The portable monitor device system may be configured to group portable monitor devices within a particular zone as a group. The zone may correspond to a particular area or volume of space. When we identify a zone we can easily look at just the people within that zone and report on them as a group. The group it reports on would be dynamic and change as people flowed in and out of the zone.

The portable monitor device system may be configured to communicate a text or voice message to people in a specific zone (e.g. based on a determined location). This could be used, for example, to mass evacuate people in the path of a threat like a tornado or fire. That is, all devices within the specified zone would receive the alert.

The portable monitor device system may be configured to show total headcount within a zone (e.g. at a particular time, such as when an alarm was initiated). For example, this may be used to tally people at a safe zone after the evacuation of another zone.

The portable monitor device system may be configured to change configurations dynamically based on location—for example, dynamically changing the emergency contacts based on geography to provide the closest available responders in all cases.

The portable monitor device system may be configured to provide entry and exit alerts, to monitor people entering and exiting high risk zones.

The portable monitor device system may be configured to provide blackout zones, where people are not tracked in specific zones (e.g. washrooms, lunchrooms).

The portable monitor device system may be configured to generate alerts if people enter zones they are not authorized to be in, either because of security clearance or they may not have the proper training to be in those areas.

Data Aggregation

The portable monitor device system may be configured to monitor gas levels dynamically, and transmit this monitoring data to a server for real-time analysis. This preferred embodiment allows existing systems to augment "heat maps" or "hot zones" where ambient gas levels may become unsafe. Without the dynamic action of a connect portable gas detector carried by a user, the constant feedback loop of atmospheric quality would be limited to only the fixed gas detectors; or, what is otherwise reported manually by a user when their traditional gas detector goes into alarm.

The system may be configured to generate a CO alarm on a device that only measures $H_2S$ by associating data from a nearby worker wearing a CO monitor which encounters a high gas alarm. The alarm is sent to the server, which checks to see if there are other devices close by. The server sends alarm messages to the close unit. The cloud server will make decisions based on instantaneous, or cumulative, data as required for each feature. The locations of every person may be important in deciding which information will be pertinent to other close by users.

In the preferred embodiment, the gas detector has a series of health and warning indicators. The gas detector signals its own functional status (e.g. power, connectivity, etc.); while simultaneously being fully capable at receiving messages. In such embodiment, the detector has a colored light that illuminates upon receiving a muster alarm. The muster alarm may be networked to a single gas detector or multiple gas detectors from a physical connected base station or administrators control panel accessed via the internet.

Instrument readings that are provided as a result of independent real-time communication, would also allow the gas detector to become capable of providing a "random walk" of sensor data. The random compiled with fixed install sensor data, when fed into an analytical safety monitoring system, would greatly augment the real-time sensor data available. Such a stochastic process depends only upon the present state of the gas detector sensor inputs, not on the sequence of events that preceded it. In other words, the gas detector acts as a spoke to many hubs, rather than a hub to spoke. The sensor information provided has no bearing on the prior reading of the atmosphere before the information was given. Such an act of walking in a non-conforming area, when nearby gas sensors may be limited by their base of fixed installation, can effectively augment conventional databases with more granular or entirely missing information. A portable and self-contained connected gas instrument would complement wireless monitoring systems already integrated to fixed instrument reading relays. This information would provide greater capability can certainty of predictive analytics to assess and mitigate risk.

Notably, the present technology also relates to techniques or methods of calculating, assessing and/or determining volatile or hazardous atmospheric conditions and and/or other activity-related quantities of the user based on or using sensor data (i.e. humidity sensor, heat sensor, accelerometer, gyroscope, etc.) acquired and distributed to another party by the capacity of the preferred embodiment to communicate dynamically, for example, devices according to any of the of the present inventions.

Other Points

In some embodiments, the alerts raised go through a safety workflow. A workflow is a series of steps that a report, inspection or other information follows until complete and closed. Workflows may involve one, two or more steps. A variety of information could be added to a workflow or report as it transitions through its steps, such as adding comments and documents or assigning actions. This may help get the person help right away and ensure that the most efficient procedure is followed, in addition to generating an audit trail so you can report on the event and track trends in reports like it (e.g. reports generated by the same safety workflow or reports which share a common characteristic such as individual or team involved, location, time, and/or threat).

In many embodiments, the sensors may be doing more than just sending the raw data. For example, the portable monitor device may be configured to perform calculations (using a processor) to provide instant or real-time feedback to the user as well as the remote monitoring center. For example, the device may be configured compare detected gas levels with thresholds to determine a threat level. Some embodiment may also be configured to integrate readings from two or more of: temperature, humidity, raw gas readings, compensation curves as well as potentially other sensor information (such as $O_2$ when reading explosive gas). These may be combined to intelligently decide on what to show the user as well as what to send and log in the remote server. That is, the device is configured to intelligently log the event so that help can be delivered (or a phone call can be made) and we can report on these events and trends in the future.

Transmission of the data and or alerts may be performed using a combination of 900 MHz and cell/sat with our data. This may increase range and provide remote coverage worldwide not within a short range. Short range communications may also be used.

As noted above, data is sent to a server for processing which can be used for immediate help but also for automatic functionality/analysis. Using a centralised processor helps allow a multitude of actions to be processed all at the same time as well as trends to be identified and reported (to help proactively prevent them from happening in the future).

As noted above, some embodiments may be configured to track the short term exposure of the user, long term exposure of the user and the health of the sensor itself. This allows us to far more accurately protect the user locally and remotely.

As noted above the system is configured to intelligently make decisions. For example, the server configuration which can be accessed remotely allows a alert response center anywhere in the world to monitor the people and the personal portable monitor devices. The server arrangement also allows multiple people to monitoring them. The safety workflow in our system is configured to analyze the alerts and/or threats and to make decisions. The data is recorded and reported to provide analytics on individual events or across all events (e.g. identifying trends).

Some embodiments are configured to, in situations where the call doesn't work to initiate the sending of an email, a text (e.g. SMS or MMS), and/or data packets directly to the device to initiate a text conversation. This provides us a series of backup methods of contacting the user or help.

Some embodiments are configured to calculate independent data such as exposures over certain periods of time and report/alert on these.

Some embodiments are configured to generate local and remote (e.g. remote audio/visual alarms. Safety workflows are configured to analyze and make decisions to help the responder help as efficiently as possible.

Some embodiments may comprise a accelerometer and a gyroscope in combination. The device may be configured to process data from both the accelerometer and the gyroscope to determine whether a particular event has occurred (e.g. the user has fallen over) and to make a decision on the portable personal monitor device then communicate it with the remote server if needed. Processing the data from multiple sources on the portable personal monitor device may help reduce false positives.

Aside from GPS some embodiments may be configured to use indoor location technology such as beacons. The beacons emit a unique identifier which is detected by the device. The device can decide what the strongest beacon it detects is and then sends that to our server. The server then has a longitude and latitude association with the beacon ID (or other position information) and is configured to intelligently put the user to that location on our map. This allows accurate locations without relying on the user telling us where they are or GPS which may not work well indoors.

The system (e.g. portable monitor device) may be configured to intelligently decide whether or not to show audio, visual and vibration alerts to the user. They also let the monitoring center know how the alarm was generated which allows the responder (or remote device) to place one-way phone calls with no indication on the device itself. This allows the responder total flexibility when responding to someone who may need silent assistance.

As noted above, the system may be configured to use a combination of GPS and beacon locations to intelligently predict the closest location. This means an area can be outfitted with beacons and our device will make intelligent decisions on what it thinks its best location is (be it a GPS signal and/or a beacon ID). This is then processed with our database in the backend to relay where the user is on a map. The system may be configured to react to a location, not just make a decision based on the location. This means if the device detects a beacon the device could make a decision based on that beacon and not the location. For example, the beacon may be associated with information such as particular threats.

A beacon may me considered to be a transmitter that emits an ID (e.g. via invisible electromagnetic radiation such as radio waves) that can be processed and sent to a server to identify a location (e.g. each ID may be associated with a location).

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A personal monitor device, the device comprising:
a gas sensor configured to measure the concentration of one or more detectable gases in the environment of the monitor device; and
a controller configured to:
store a relationship between the concentration of one or more detectable gases and a concentration of one or more particular gases, wherein the one or more detectable gases are different from the one of more particular gases; and
determine the concentration of the one or more particular gases based on the stored relationship and the measured concentration of one or more detectable gases.

2. The personal monitor device according to claim 1, wherein one of the particular gases is benzene.

3. The personal monitor device according to claim 1, wherein the one or more detectable gases comprise hydrocarbons.

4. The personal monitor device according to claim 1, wherein the personal monitor device is configured to enable association of cumulative exposure data with a particular user.

5. The personal monitor device according to claim 4, wherein the personal monitor device is configured to restrict a user from entering a particular location associated when the cumulative exposure of the user has exceeded a predetermined threshold.

6. The personal monitor device according to claim 4, wherein the personal monitor device is configured to activate an alarm when the cumulative exposure has exceeded a predetermined threshold.

7. The personal monitor device according to claim 1, wherein the personal monitor device is configured to store multiple relationships between the concentration of one or more detectable gases with the concentration of one or more particular gases, and
    wherein the personal monitor device is configured to determine which relationship to use in the concentration determination based on one or more of:
        the location of the personal monitor device;
        the time;
        the identity of the one or more detectable gases; and
        the measured concentration of one or more detectable gases.

8. The personal monitor device according to claim 1, wherein the device is configured to activate an alarm when the concentration of the one or more particular gases has exceeded a predetermined threshold.

9. The personal monitor device according to claim 1, wherein the device is configured to:
    determine the cumulative exposure to the one or more particular gases by integrating the determined concentration over time; and
    provide an indication of the cumulative exposure.

10. The personal monitor device according to claim 1, wherein the gas sensor comprises an IR sensor or a pellistor sensor.

11. The personal monitor device according to claim 1, wherein the personal monitor device is configured to be used by multiple users by:
    identifying a user when activating the monitor device; and
    associating cumulative exposure to the gas to the identified user.

12. A method comprising:
    measuring the concentration of one or more detectable gases in the environment;
    storing a relationship between the concentration of one or more detectable gases and the concentration of one or more particular gases, wherein the one or more detectable gases are different from the one of more particular gases; and
    determining the concentration of the one or more particular gases based on the stored relationship and the measured concentration of one or more detectable gases.

13. The method according to claim 12, wherein the method comprises:
    associating the determined concentration of the particular gas with a particular user, and
    determining a cumulative exposure by aggregating data from multiple monitor devices associated with the particular user.

* * * * *